United States Patent [19]
Werth et al.

[11] 3,969,138
[45] July 13, 1976

[54] SODIUM-ALUMINUM HALIDE, SULFUR BATTERY

[75] Inventors: John Werth, Princeton; Jack C. Sklarchuk, Trenton, both of N.J.

[73] Assignee: ESB Incorporated, Philadelphia, Pa.

[22] Filed: June 9, 1975

[21] Appl. No.: 585,021

[52] U.S. Cl............................ 136/6 FS; 136/100 R
[51] Int. Cl.²........................................ H01M 43/00
[58] Field of Search.................. 136/6 F, 6 FS, 6 L, 136/6 R, 20, 83 R, 83 T, 100 R, 6 LF, 137, 155

[56] References Cited
UNITED STATES PATENTS

| | | |
|---|---|---|
| 3,635,765 | 1/1972 | Greenberg ........................ 136/83 R |
| 3,751,298 | 8/1973 | Senderoff ........................... 136/6 F |
| 3,877,984 | 4/1975 | Werth ................................. 136/6 F |
| 3,879,224 | 4/1975 | Farrington et al. ............... 136/83 R |

*Primary Examiner*—Anthony Skapars
*Attorney, Agent, or Firm*—Anthony J. Rossi

[57] ABSTRACT

A secondary battery utilizing a molten sodium negative reactant, a sulfur-aluminum halide positive reactant melt having a carbon powder dispersed within the melt, a molten sodium haloaluminate electrolyte, and a selectively ionically-conductive separator positioned between the negative and positive reactants.

6 Claims, 2 Drawing Figures

FIG. I

SODIUM-ALUMINUM HALIDE, SULFUR BATTERY

BACKGROUND OF THE INVENTION

1. Field of the Invention

This invention relates to secondary electrochemical cells and more particularly to secondary electrochemical cells utilizing a molten sodium negative reactant, a solid ionically-conductive separator, a molten sulfur and molten aluminum halide positive reactant, and a molten sodium haloaluminate electrolyte.

2. Description of the Prior Art

It may be explained here that U.S. Pat. No. 3,404,035 discloses a secondary battery that in its fully charged condition has a molten sodium negative reactant, a molten sulfur positive reactant and a solid electrolyte-separator of beta alumina or its derivative disposed between the positive and negative reactants. In its discharged or partially discharged condition, it has an additional electrolyte comprising a sodium polysulfide ($Na_2S_x$) on the positive reactant side of the beta alumina separator.

The potential of this battery is typically in the range of from about 2 to 2.2 volts and the operating temperature of this battery is in the range of 265° to 350°C. in order to keep the discharge products, $Na_2S_x$, molten at all times. It is recognized by those skilled in the art, however, that operation of this type battery at about or above 265°C cannot be carried out without attendant problems. For example, $Na_2S_x$ is a strong oxidizing agent at these elevated temperatures and will tend to effect rapid corrosion and chemical attack of containers, current collectors, seals, and separators of the battery, thus seriously reducing the useful life of the battery.

A novel secondary battery has now been discovered which utilizes a molten sodium negative reactant, a molten sulfur and aluminum halide positive reactant in contact with a molten sodium haloaluminate electrolyte. This battery can operate at a temperature as low as from about 150°C. to about 225°C. and thus greatly reduce the corrosion and chemical attack problems associated with sodium-sulfur batteries of the type described above. Additionally and surprisingly, it has been found that the potential of this novel battery approaches or exceeds 2.66 volts.

SUMMARY OF THE INVENTION

This invention is directed to a novel secondary battery comprising in combination a molten sodium negative reactant, a sulfur and aluminum halide positive reactant melt, a carbon powder dispersed within the positive reactant melt, a solid member separating the negative reactant and the positive reactant, and a molten electrolyte on the positive reactant side of the solid member. The solid member which separates the negative and positive reactants is selectively-ionically conductive to sodium cations. The molten electrolyte on the positive side of the solid member comprises molten sodium halide-aluminum halide (a molten sodium haloaluminate).

DESCRIPTION OF THE INVENTION

Figure 1:
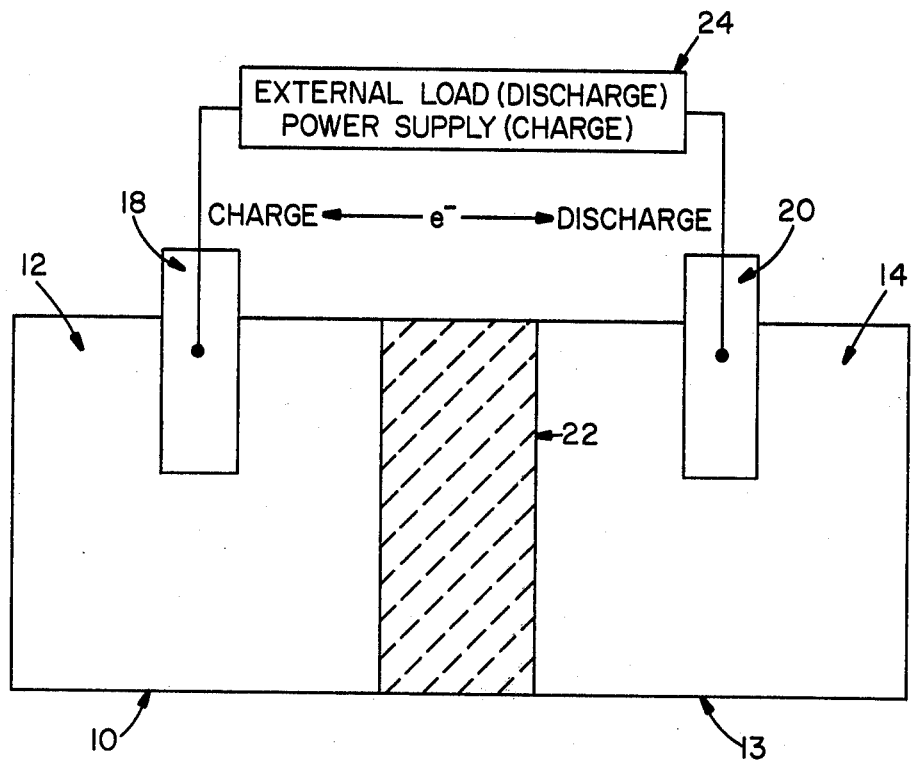
FIG. 1 is a schematic, cross-sectional view of a simple cell in accordance with this invention.

In the operation of the secondary or rechargeable battery of this invention, a high potential is achieved by utilizing a molten sodium negative reactant and a molten sulfur and molten aluminum halide positive reactant having a carbon powder dispersed therein, separating the two reactants by means of a solid member which is selectively-ionically conductive to sodium cations and maintaining on the positive reactant side of the solid separating member a molten electrolyte comprising sodium haloaluminate.

In accordance with this invention, the negative reactant or reductant is sodium maintained above its melting point when the cell is in operation. The negative reactant is initially heated by any conventional means such as induction heating by electrical means, direct heating, or indirect heat exchange with a suitable heated fluid exchange means. The negative reactant functions as a conductor through which electrons flow to the external circuit during discharge.

The positive reactant of the present invention comprises molten sulfur and molten aluminum halide. The specific aluminum halide selected for use will be determined by such factors as the end use to which the battery is to be put; the economics involved, e.g. the cost of starting materials; the desired operating pressure of the cell; and the specific sodium halo-aluminate electrolyte selected for use in the battery. One criterion must however be satisfied by the aluminum halide selected. It must be soluble to some extent in the sodium haloaluminate electrolyte of the battery.

So long as this criterion is satisfied, the selection of the specific aluminum halide to be utilized becomes a practical question rather than a critical one, i.e. depending on economics, end use and the like. The preferred aluminum halide for use in combination with sulfur in the positive reactant melt is aluminum chloride.

The solid member which separates the negative reactant and the positive reactant in the instant invention must be selectively-ionically-conductive to sodium cations. Materials suitable for use as the solid separator include glass, beta aluminas and other sodium cation conductive crystalline and/or glassy materials that are resistant to the molten sodium negative reactant and have satisfactorily low resistivities. The preferred separator comprises a beta alumina cationically-conductive crystalline structure consisting essentially of a structural lattice and sodium cations which are mobile in relation to said lattice. The solid separator member may be prepared by any art known means, see for example, U.S. Pat. No. 3,535,163, so long as the useful end product is selectively-ionically-conductive to sodium cations.

The electrolyte utilized in the present invention makes possible a substantial reduction in the operating temperature of molten sulfur batteries as compared with those presently known and used in the art. For example, the operating temperature of the normal molten sodium-molten sulfur secondary battery wherein the molten cathodic electrolyte is an ionized combination of sodium and sulfur, i.e. ions of sodium polysulfide, $Na_2S_5$, the operating temperature is recognized to be well above 200°C. and closer to 300°C., the melting temperature of sodium pentasulfide being as high as 265°C. In marked contrast, the battery of the present invention utilizes an electrolyte on the positive reactant side of the solid separating member which comprises molten sodium haloaluminate and permits the operation of the instant battery to be carried out at temperatures of about 150°C. to about 225°C. The advantages of operating at a reduced temperature are of course apparent, e.g. reduced corrosion, increased battery life, and reduced cost of containers and seals, e.g. silicone rubber may be used as a negative gasket seal.

By the term molten sodium haloaluminate as used herein is meant materials which include sodium halides, as for example, chlorides, bromides, fluorides or iodides of sodium, and aluminum halides, for example chlorides, bromides, fluorides or iodides of aluminum. All of these alkali metal halides will form the corresponding alkali metal haloaluminate electrolytes of the invention. The preferred electrolyte is sodium chloroaluminate.

In the battery of the present invention, the positive reactant (sulfur and aluminum halide) is mixed with the sodium haloaluminate by any means known in the art, e.g. it is possible to mix sulfur, sodium chloride and aluminum chloride together with the positive reactant and heat the resultant mix until sodium chloroaluminate and the positive reactant are formed within the cell. It should be noted that while the battery of this invention is a sodium-aluminum halide, sulfur battery, the aluminum halide which is present in the cell in the charged state, i.e. present in the sodium haloaluminate positive reactant melt within this cell, may be added initially as the metal itself, picking up halide ions from the ionized sodium haloaluminate upon charging. Therefore, even though a metal was added initially, the positive reactant of the cell will comprise molten sulfur and molten aluminum halide in the charged state. It is believed that the overall reaction of this cell is a reaction between aluminum halide, sulfur, and sodium to form sodium halide and aluminum sulfide.

Referring now to FIG. 1, a single cell secondary battery according to the invention is diagrammatically shown having a negative reactant cell compartment 10 which may be made of any suitable material or materials which are not attacked by molten sodium at the operating temperature of the cell (about 150°C to 225°C.), e.g. carbon steel, aluminum, certain ceramics, certain heat and chemical resistant polymers, a suitable glass or an alpha alumina or derivative thereof, all thermally insulated with fiberglass, rockwool or other insulation. Inside compartment 10 is a molten sodium negative reactant 12. Inside a positive reactant compartment 13 is a sodium haloaluminate-sulfur melt 14. A carbon powder is in the melt 14 and serves the purpose of a dispersed current collector.

The positive reactant compartment 13 may be made of any suitable material such as glass, ceramic, tungsten and the like. Current collectors 18 and 20 are disposed within the negative and positive reactant compartments 10 and 13, respectively, and may be made of any suitable material such as for example, tungsten wire, carbon rods and the like. A solid separating member 22 is disposed between the compartments 10 and 13. The requirements of the separating member 22 have been described above. The current collectors 18 and 20 provide means for connecting the cell with an external circuit 24 which closes the circuit of the cell. The external circuit 24 may include any suitable utilization device or load, voltmeter, ammeter, etc. which has not been shown other than as indicated in FIG. 1.

A better understanding of the battery in accordance with the invention can be obtained from the following examples which are intended to be merely illustrative of the invention and not in limitation thereof.

EXAMPLES

The following information applies to all cells tested in the examples unless otherwise indicated. Also, unless otherwise indicated, all quantities are by weight.

1. Makeup of Cells

The cells comprised a Pyrex glass positive container, a carbon steel negative container and a beta alumina separator disc. The negative seal was silicone rubber, and the positive seal was Teflon. The negative current collector was the steel sodium container. The positive current collector varied as to type and configuration, as described in the examples, but in all cases it was sealed to the Pyrex glass with a Monel Gyralok fitting containing Teflon ferrules. In all cases the carbon was Cabot Vulcan XC-72R. This carbon has a relatively low surface area of approximately 200 square meters/gram.

EXAMPLE 1

Cell Assembly

A 2.2 gram strip (0.5cm × 30cm × 0.076cm) of milled sheet that contained 53% sulfur, 45% XC-72R conductive carbon black, and 2% Teflon binder, was formed into a coil along with an expanded molybdenum metal current collector and inserted in the Pyrex positive glass compartment. The cell was then assembled and sealed to the beta alumina separator disc. The cell was heated to 300°C and tested for 1.0 hour as a regular sodium-surfur cell, i.e. of the type described in U.S. Pat. No. 3,404,035. At 100 mA the cell voltage was 2.0v. The cell was cooled to room temperature and 2.4 grams of aluminum chloride were added. This cell was then heated to 180°C. and put on automatic cycle test in an automatically controlled furnace and inert atmosphere. The cell underwent one complete cycle and 5 hours of discharge at which time it was opened and 1.0 gram of sodium chloroaluminate (20% NaCl) was added to the positive compartment. Cycle data are given below.

Positive compartment ingredients

| 2.2 grams of milled sheet: | 1.17 grams of S (53%) |
| | 0.99 grams of XC-72R carbon (45%) |
| | 0.04 grams of Teflon (2%) |
| 3.2 grams of AlCl₃ | |
| 0.2 grams of NaCl | |
| molybdenum current collector | |

| Cycle | Mode C=charge D=discharge | Current (mA) | Voltage Cut-Offs Set at 1.85 and 3.75 V Polarization (mV) | Cell Volts (average) | Capacity (A hrs.) | T°C. | Remarks |
|---|---|---|---|---|---|---|---|
| 1 | D | 50 | 150 | 2.3 | 0.50 | 178 | |
| | C | 50 | 200 | 3.0 | 0.28 | | |

-continued

| | | | | | | |
|---|---|---|---|---|---|---|
| 2 | D | 50 | 300 | 2.25 | 0.65 | 178–184  1 gram of sodium chloro-aluminate added |
| | C | 50 | 100 | 2.90 | 0.70 | 181–186 |
| 3 | D | 50 | 200 | 2.45 | 0.73 | 184–186 |
| | C | 50 | 200 | 2.95 | 0.68 | 185 |

EXAMPLE 2

Cell Assembly

A 2.0 cm diameter disc 0.64 cm thick was stamped from a milled sheet that contained 40% sulfur and 60% carbon. The disc weighed 1.25 grams. This disc was placed into the positive glass compartment, then the cell was assembled. A tungsten rod was used as the current collector and pressed against the upper surface of the milled carbon-sulfur disc. The lower surface of the milled disc pressed against the beta alumina separator. After assembly 2.75 grams of sodium chloroaluminate (20% NaCl) were added through the top of the positive Pyrex glass compartment. A seal was made from the glass compartment to the tungsten rod with a Monel Swagelok, then the cell was heated and put on automatic cycle test at 210°C. Cycle data are given below.

| Cycle | Mode C=charge D=discharge | Current (mA) | Polarization (mV) | Cell Volts (average) | Capacity (A hrs.) |
|---|---|---|---|---|---|
| 1 | D | 50 | 160 | 2.5 | 0.61 |
| | C | 50 | 160 | 2.80 | 0.62 |
| 2 | D | 100 | 260 | 2.40 | 0.435 |
| | C | 100 | 260 | 2.90 | 0.442 |
| 3 | D | 100 | 260 | 2.40 | 0.452 |
| | C | 100 | 260 | 2.90 | 0.456 |
| 10 | D | 100 | 260 | 2.40 | 0.442 |
| | C | 100 | 260 | 2.90 | 0.440 |

EXAMPLE 3

A cell was assembled with a tungsten wire coil current collector placed in the positive glass compartment. The tungsten wire was sealed to a 0.64 cm diameter glass tube which was then sealed to the positive glass compartment with a Monel Swagelok. The positive ingredients were added in powder form in the charged state before making the Swagelok seal. After making the seal, the cell was heated to 210°C and put on automatic cycle test.

Positive Mix
  1.0 gram of blend containing 25% sulfur and 75% XC-72R conductive carbon
  6.0 grams of sodium chloroaluminate: 1.5 grams of NaCl; 4.5 grams of AlCl$_3$.
Cycle data are given below:

| Cycle | Mode C=charge D=discharge | Current mA | Polarization mV | Avg. Voltage | Capacity A hrs. |
|---|---|---|---|---|---|
| 1 | D | 50 | 95 | 2.58 | 0.48 |
| | C | 50 | 95 | 2.85 | 0.47 |
| 2 | D | 50 | 95 | 2.58 | 0.42 |
| | C | 50 | 95 | 2.85 | 0.43 |

EXAMPLE 4

A cell was assembled as in Example 3. The following positive ingredients were added:

A mixture of 25% sulfur and 75% XC-72R conductive carbon was preheated to 160°C. in an inert atmosphere to absorb the sulfur in the carbon. The positive mix then comprised:
  1.30 grams of above mixture;
  0.75 grams of NaCl; and
  3.00 grams of AlCl$_3$
cycle data are given below:

| Cycle | Mode C=charge D=discharge | Current mA | Polarization mV | Cell Volts (avg.) | Capacity (A hr.) |
|---|---|---|---|---|---|
| 1 | D | 50 | 250 | 2.55 | 0.60 |
| | C | 50 | 250 | 2.95 | 0.58 |
| 2 | D | 50 | 250 | 2.55 | 0.58 |
| | C | 50 | 250 | 2.95 | 0.60 |
| 3 | D | 50 | 250 | 2.55 | 0.57 |
| | C | 50 | 250 | 2.95 | 0.58 |
| 4 | D | 50 | 250 | 2.55 | 0.58 |
| | C | 50 | 250 | 2.95 | 0.54 |
| 5 | D | 50 | 250 | 2.55 | 0.51 |
| | C | 50 | 250 | 2.95 | 0.57 |
| 6 | D | 50 | 250 | 2.54 | 0.56 |
| | C | 50 | 250 | | |

Figure 2:
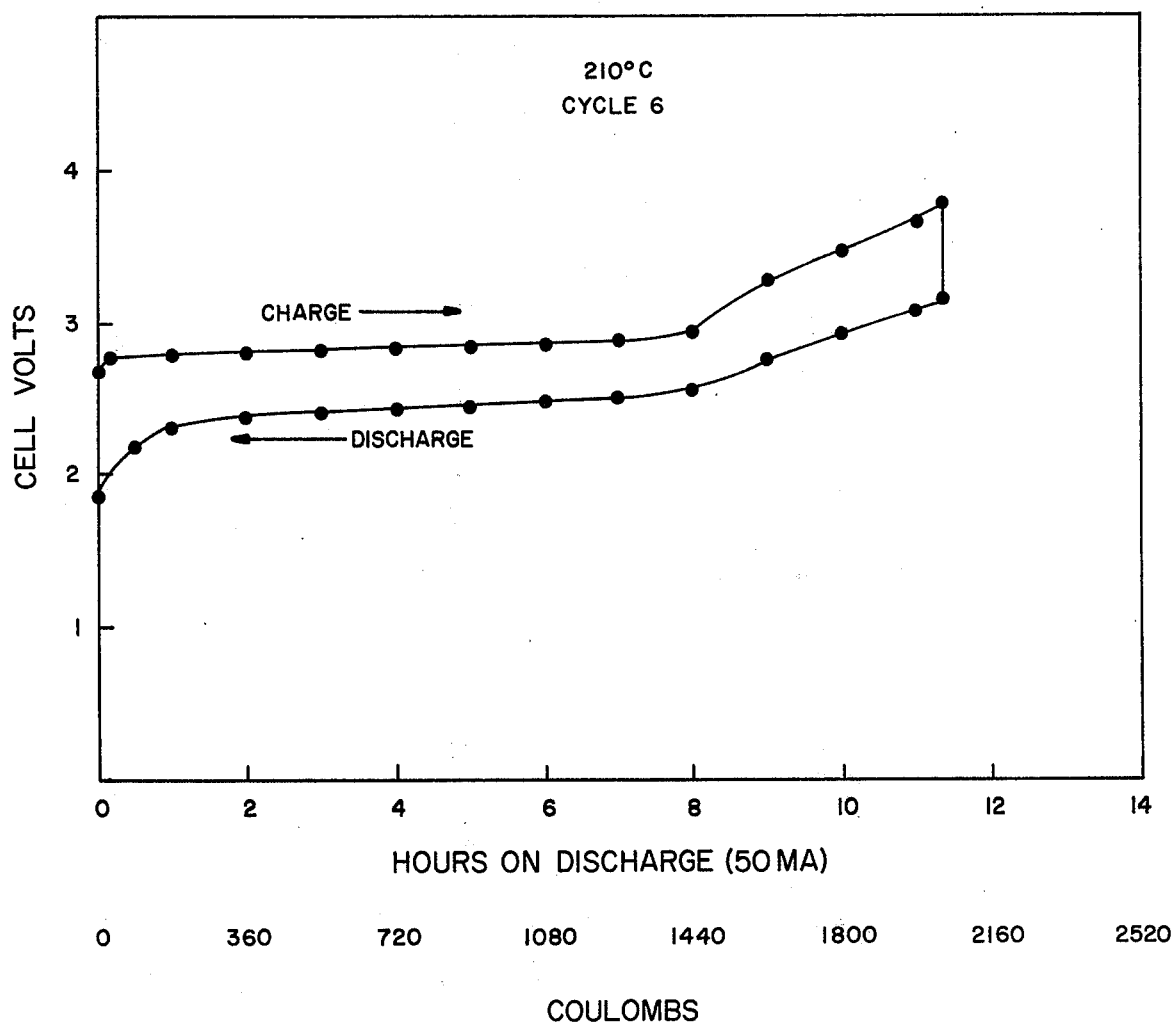
FIG. 2 is a graphic representation of the charge-discharge cycle of a cell of this invention.

Also see FIG. 2 for charge-discharge cycle of this cell on Cycle 6.

EXAMPLE 5

A cell can be assembled as in Example 4. The following positive ingredients can be added:

A mixture of 25% sulfur and 75% XC-72R conductive carbon can be preheated to 160°C. in an inert atmosphere or a vaccum to absorb the sulfur in the carbon as in Example 4.

The positive mix will then comprise:
  1.30 grams of above mixture;
  1.3 grams of NaBr$_3$;
  6.0 grams of AlBr$_3$
Such a cell would behave similarly to the cell described in Example 4.

The foregoing examples and detailed description have been given for clarity of understanding only and no unnecessary limitations are to be understood therefrom. The invention is not limited to exact details shown and described for obvious modifications will occur to one skilled in the art.

The embodiments of the invention in which an exclusive property or privilege is claimed are defined as follows:

1. A secondary battery comprising in combination:
  a. a molten sodium negative reactant;
  b. a positive reactant comprising molten aluminum halide and molten sulfur;
  c. a solid member separating the negative and positive reactants, said member being selectively ionically conductive to sodium cations;

d. a molten sodium halide-aluminum halide electrolyte on the positive reactant side of the solid member;

e. a carbon powder dispersed within the molten sodium halide, molten aluminum halide and molten sulfur; and f. a current collector disposed in each the positive and negative reactants.

2. A battery according to claim 1 wherein the operating temperature of the battery is from about 150°C. to 225°C.

3. A battery according to claim 1 wherein the solid member is beta alumina.

4. A battery according to claim 1 wherein the positive reactant comprises molten sulfur and molten aluminum chloride.

5. A battery according to claim 1 wherein the electrolyte comprises molten sodium chloride and molten aluminum chloride.

6. A battery according to claim 1 wherein the aluminum halide is selected from the group consisting of the chlorides and bromides of aluminum and mixtures thereof, and wherein the sodium halide-aluminum halide electrolyte is selected from the group consisting of chlorides and bromides of sodium and aluminum and mixtures thereof.

* * * * *